Sept. 14, 1937.　　　D. H. MONTGOMERY　　　2,093,111
FLUID PRESSURE CHUCKING SYSTEM
Filed Nov. 18, 1933　　　4 Sheets-Sheet 1

INVENTOR
DONALD H. MONTGOMERY
BY
ATTORNEYS

Sept. 14, 1937.　　　D. H. MONTGOMERY　　　2,093,111
FLUID PRESSURE CHUCKING SYSTEM
Filed Nov. 18, 1933　　　4 Sheets-Sheet 2
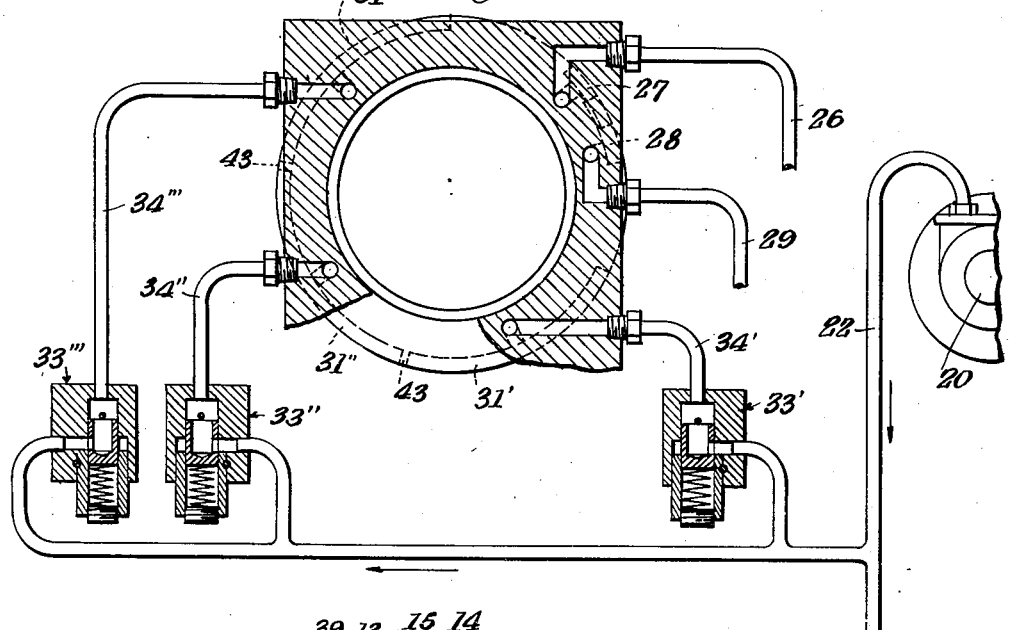
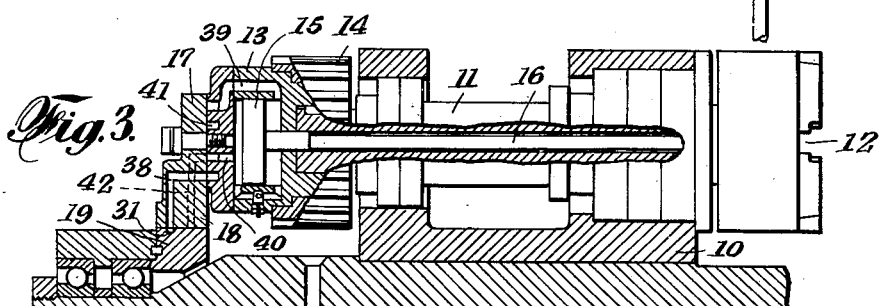
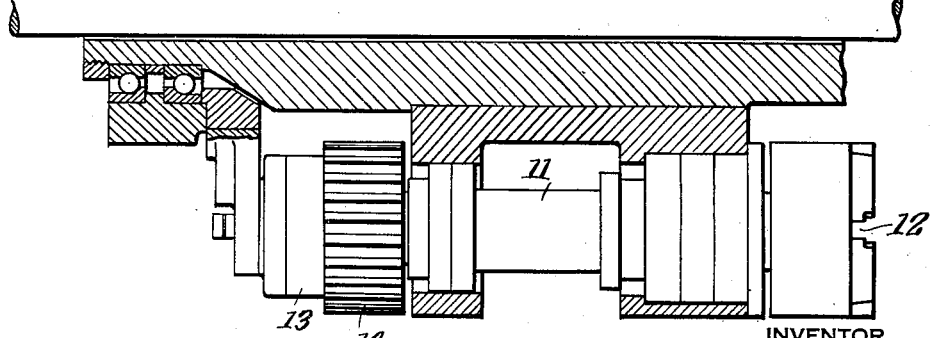
INVENTOR
DONALD H. MONTGOMERY
BY
*Mitchell Behut*
ATTORNEYS Sept. 14, 1937.   D. H. MONTGOMERY   2,093,111
FLUID PRESSURE CHUCKING SYSTEM
Filed Nov. 18, 1933   4 Sheets-Sheet 3

INVENTOR
DONALD H. MONTGOMERY
BY
Mitchell Buhut
ATTORNEYS

Sept. 14, 1937.  D. H. MONTGOMERY  2,093,111
FLUID PRESSURE CHUCKING SYSTEM
Filed Nov. 18, 1933  4 Sheets—Sheet 4
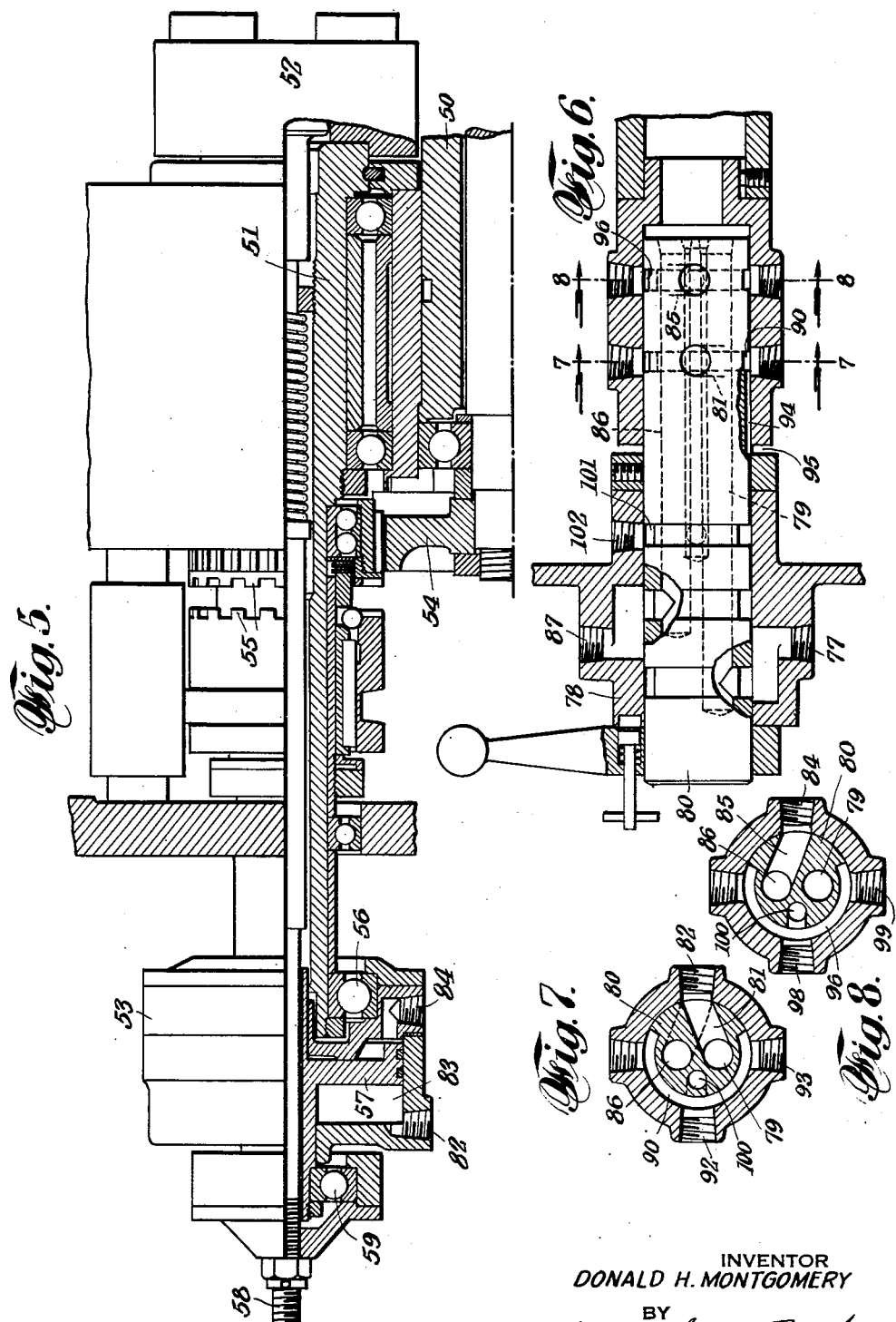
INVENTOR
DONALD H. MONTGOMERY
BY
Mitchell Bechert
ATTORNEYS Patented Sept. 14, 1937

2,093,111

UNITED STATES PATENT OFFICE 2,093,111

FLUID PRESSURE CHUCKING SYSTEM

Donald H. Montgomery, Berlin, Conn., assignor, by mesne assignments, to The New Britain Machine Company, New Britain, Conn., a corporation of Connecticut Application November 18, 1933, Serial No. 698,611

28 Claims. (Cl. 29—38)

My invention relates to a fluid pressure chucking system. Heretofore in station type chucking machines and the like it has been common practice to employ a piston and cylinder and fluid under pressure for chucking and unchucking the work in the loading station and to maintain the fluid chucking pressure on the chuck as the same indexes from station to station.

Generally speaking, it is desirable to employ high pressure fluid for chucking the work in order that the chuck jaws may "bite" into the work so as to hold the same securely. However, as stock is removed in the work stations of a multiple spindle machine, or as stock is removed from the work piece in a single spindle machine, the work piece becomes thinner in section, and with the fluid pressure constantly acting on the chuck the latter tends to follow up the work, and any distortion of the work due to a thinning of the section or otherwise is thus aggravated by what may be termed the follow up of the chuck.

It is the principal object of my invention, therefore, to provide a fluid pressure chucking system in which the tendency of the chuck to follow up the work is substantially reduced.

It is a further object to provide a fluid pressure chucking system in which a high chucking pressure may be employed either initially in the loading station or subsequently in a work station so as to secure an effective grip on the work, and then the pressure may be reduced one or more times during the machining of the work piece, so as to avoid or minimize distortion of the latter.

Other objects and features of invention will be either hereinafter pointed out or will become apparent to one skilled in the art upon a reading of the specification taken in connection with the accompanying drawings.

Briefly stated, in a preferred form of the invention, if embodied in a station type chucking machine, I employ fluid pressure actuated means, such as a piston and cylinder, for each chuck. Two sources of pressure fluid or pressure fluid at two different pressures are employed. The chucking means in loading station is subjected to a high pressure so as to cause the chuck to "bite" into the work, and thereafter the pressure on the chuck is reduced, so that in case of initial or subsequent distortion of the work the tendency of the chuck to follow up the work and cause further distortion will be greatly minimized, and yet the work piece will be gripped with sufficient security for the manchining operations.

Gridley et al. application, Serial No. 394,232, filed September 21, 1929, discloses a fluid pressure chucking system in which a pump and an accumulator are employed, the accumulator pressure being employed for chucking and unchucking, and the high pump pressure employed for maintaining the chucks closed.

In Gridley et al. application, Serial No. 551,136, filed July 16, 1931, there is disclosed another fluid pressure chucking system in which accumulator pressure is employed for chucking the work in loading station, and pump pressure is likewise employed in that station for assuring the complete closing of the chuck. Direct pump pressure is disclosed in that application as maintaining the chuck closed while in working stations.

In disclosing my present invention I have shown, by way of illustrations of embodiments of my invention, certain parts of the drawings of the applications above identified.

In the drawings—

Fig. 2 is a fragmentary view similar to Fig. 1 but illustrating a modification;

Fig. 3 is a side view in partial section of a spindle carrier or turret and illustrating fluid pressure chucking mechanism as embodied schematically in Fig. 1 or 2;

Fig. 5 is a side view in quarter section of one spindle and associated parts, said spindle being typical of a plurality of spindles as illustrated in Fig. 4;

Fig. 6 is a central sectional view of the distributor valve mechanism illustrated more or less diagrammatically in Fig. 4;

Fig. 7 is a sectional view taken substantially in the plane of the line 7—7 of Fig. 6;

Fig. 8 is a sectional view taken substantially in the plane of the line 8—8 of Fig. 6.

Figure 1:
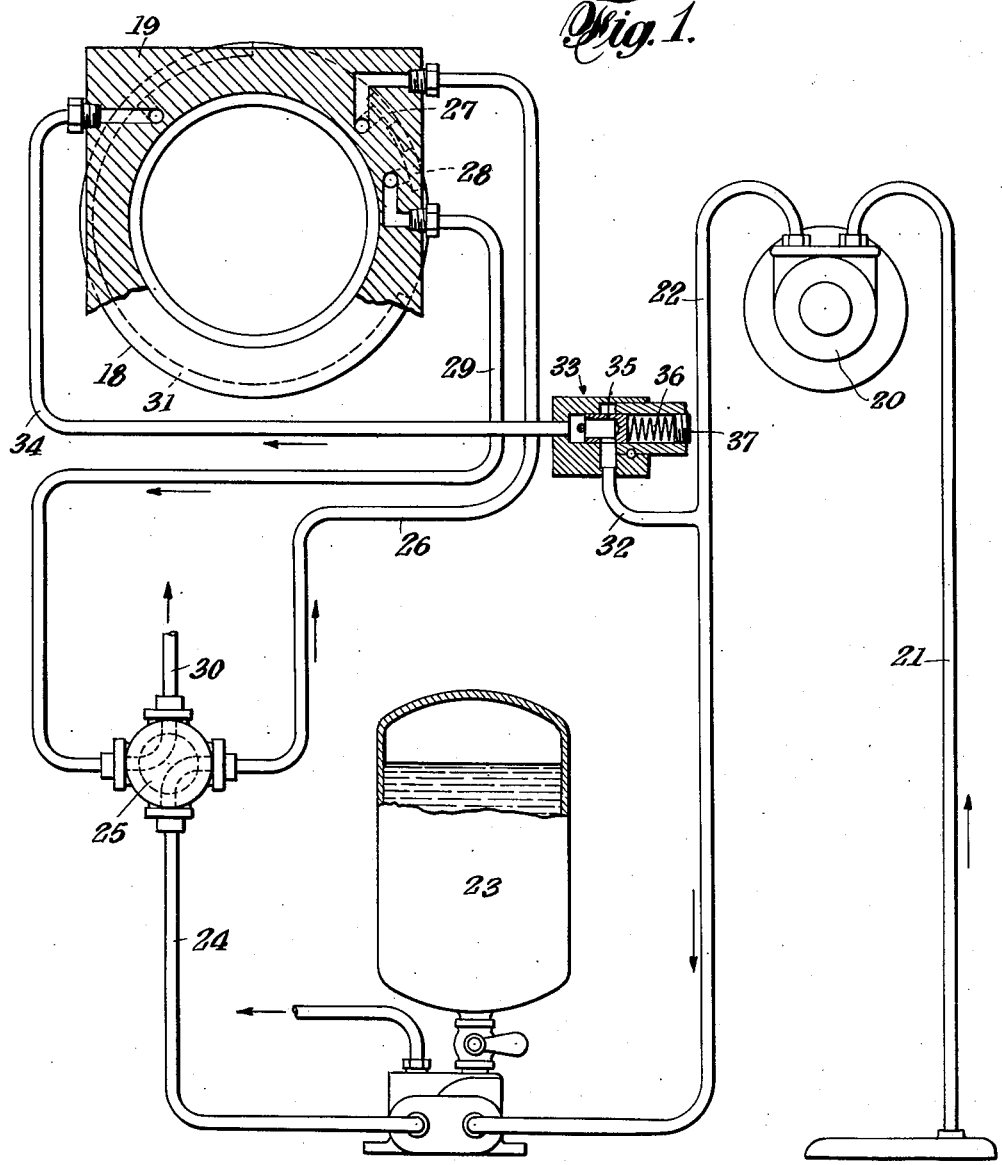
Fig. 1 illustrates a more or less schematic or diagrammatic view of the fluid pressure chucking system for a multiple spindle chucking machine illustrated more particularly in said application, Serial No. 394,232, but illustrating features of my invention.

Referring to Figs. 1, 2, and 3, and particularly to Fig. 3 illustrating the chucking machine of said application, Ser. No. 394,232, 10 indicates generally a spindle carrier carrying a plurality of rotatable spindles 11—11 having chucks 12 at the forward end thereof and cylinders 13—13 at the rear end thereof and rotatable therewith. The spindles are rotated by means of a chain (not shown) trained over sprockets 14—14 carried by or with the spindles. Each cylinder is provided with a piston 15 which, through the piston rod 16, serves to actuate the chuck 12. In the form illustrated, the chuck is closed by a rearward or left-hand movement of the piston 15.

Each of the cylinders is rotatably connected to a distributor ring 17, which moves with the cylinders while indexing, but the cylinders are free to rotate relatively to the distributor ring 17 and remain in reasonably fluid-tight engagement therewith during rotation. The distributor ring 17 surrounds and fits the cylindrical periphery 18 of the distributor block 19, which is fixedly carried by the frame of the machine. The distributor ring 17 and cylinder are provided with passages, as will be more fully described, for the passage of fluid to and from the cylinders for the purpose of actuating the chucks.

In the form shown, pressure fluid is supplied by pump 20 drawing from a well through pipe 21 and discharging through pipe 22. The pipe 22 discharges into and charges the accumulator 23. In the discharge line 22, or, at any rate, before the pumped fluid enters the accumulator, it must pass through what may be termed a pressure retaining valve (not shown), to prevent the entry of fluid into the accumulator from the line 22 until a predetermined pressure, as adjusted by the pressure retaining valve, has been attained in the pump line 22. A suitable relief valve (not shown) permits the discharge of excess fluid from the accumulator when the pressure in the accumulator has attained the desired limit.

From the accumulator, fluid is led through a pipe 24 to a valve 25, which may be suitably actuated, though preferably by hand. With the valve 25 in the position shown in Fig. 1, fluid from the accumulator passes through pipe 24, then through valve 25, and into line 26, which is connected to a passage in the distributor block 19 and ultimately reaches the circumferential short open groove 27 in the cylindrical outer surface of the block 19. A second short, open groove 28, similar to the groove 27, is formed circumferentially in the cylindrical outer surface of the block 19. The groove passages 27—28 in the form shown are axially spaced from each other and may also be circumferentially spaced or overlapping, as shown. From the passage 28, a pipe 29 leads back to the valve 25, and, as shown, with the valve in its present position communicates with the discharge or waste pipe 30.

The distributor block 19 is provided with a long open groove 31, shown as extending about two-thirds of the way around. This groove is connected directly to the pump line 22 through pipe 32, reducing valve 33, and pipe 34, which ultimately discharges into the groove 31, as will be clear from Fig. 1. The check valve 33 embodies a movable valve body 35, spring pressed toward the left by means of a spring 36 and limited in its left-hand movement by means of the cross-pin illustrated. The spring may be stressed to the desired extent by means of an adjusting screw 37.

The operation of the device as thus far described may be as follows, the parts being in the positions shown in the drawings:

The long groove 31 (Fig. 3) is in communication with a passage 38 in the distributor ring 17, which passage, through an annular groove in the cylinder 13, communicates with the passage 39 in the cylinder and ultimately with the tail-end of the cylinder. Thus, with pressure fluid supplied to the groove 31, the piston 15 will be moved toward the left or in chucking direction. The head end of the cylinder is connected through passage 40 and annular groove 41, with a passage 42 in the distributor ring 17, which passage 42, when the chuck is in loading position, will extend over the short groove 27 in the distributor block (Fig. 1). When the chuck just described is in loading position, the passage 38 will extend over and be in communication with the short groove 28 (Fig. 1). Thus, when the chuck is in loading position and the valve 25 set as shown, fluid from the accumulator will pass through pipe 24, valve 25, pipe 26, into passage 27, and thence to passage 42 in the distributor ring, and through passage 40 into the head end of the cylinder so as to urge the piston forwardly or to the right for opening the chuck. At the same time, fluid in the tail-end of the cylinder will pass through passage 39, into passage 38 in the distributor ring, thence to short annular groove 28, and from there through pipe 29 and valve 25 to the discharge or waste pipe 30. The piston 15 will then move to the right to unchuck the work. By shifting the valve so as to disconnect the pipes at present connected and so as to connect the pipes 26—30 and the pipes 24—29, the flow of fluid will be from the accumulator to the tail-end of the cylinder and the head end will then exhaust, as heretofore described, and the chuck will again be closed.

It should be noted that, during the actuation of the chuck in loading station as described, the other chucks in work stations will all be in communication through the long circumferential groove 31 and their respective passages 38 in the distributor ring 17 with the tail-ends of the cylinders so as to maintain the chucks in work stations closed.

My invention relates particularly to the means for employing relatively high pressures for chucking the work and relatively lowering the pressures on chucks in working stations. It is to be noted, referring particularly to Fig. 1, that, due to the check valve 33, the pressure in line 34 will not be permitted to exceed the limit as determined by the adjustment of the spring 36 by the adjusting screw 37. Thus, merely by way of example, the check valve 33 may be set so as to maintain a maximum limit of 100 pounds in the line 34 so that all of the chucks in work stations will be subjected to a maximum pressure of 100 pounds. The pressure retaining valve (not shown) between the pump discharge pipe 22 and accumulator 33 may be set at, say 100 pounds, or slightly more so that a pressure of at least 100 pounds will be maintained in the lines 22, 32, and 34. At the same time, the relief valve (not shown) from the accumulator 23 may be set so as to build up pressure in the accumulator until a pressure of, say, 300 pounds has been attained. Thus, we may assume a maximum pressure of 300 pounds in the accumulator, while the chucks in working stations are subjected to a maximum uniform pressure of 100 pounds.

The pressure fluid from the accumulator is caused to unchuck the work upon actuation of the valve 25 and to again chuck the same upon reversal of the valve. The final pressure for chucking the work by means of the pressure fluid from the accumulator 23 may be, say, 200 pounds so that the chuck will be closed and caused to "bite" into the work piece so as to firmly grip the same. As soon as the spindle carrier indexes to bring the newly chucked work piece into a work station, its passage 38 in the distributor ring, communicating with the tail-end of the cylinder, will pass from the short groove 28 and will then pass into communication with the long annular groove 31, which, as heretofore stated, and due to the reducing valve 33, is subjected to a uniform pressure of 100 pounds. It will thus been seen that I have provided means for chucking the work at a relatively high pressure so as to ensure a proper gripping of the work piece, and in order to prevent distortion of the work piece or minimize the effect of the follow up of fluid pressure chucking of the work piece, the fluid pressure is reduced upon each chuck as it reaches the work station.

In the modification shown in Fig. 2, the parts may be substantially the same as heretofore described, but the long passage groove communicating with the cylinders in work stations, instead of being a single continuous passage, may be divided into zones by means of dividing partitions 43—43, so as to provide, in effect, separate passage grooves 31'—31''—31''', corresponding generally to the three work stations of a four station machine. Between the pipe 22 and the line 34' communicating with the passage 31' is a reducing valve 33', which may be set to predetermine the pressures in the groove 31'. Between the pump line 22 and the line 34'' communicating with the passage 31'', a second reducing valve 33'' may be interposed, and such valve may be adjusted to secure the desired pressure in the groove 31''. Also, between the line 34''' and pump line 22, I may employ another reducing valve 33''', and that valve may be set so as to secure the desired pressure in the groove 31'''.

With the device modified as illustrated in Fig. 2, it is thus possible to chuck the work in the loading station by means of a relatively high pressure from the accumulator, as heretofore described. When the newly chucked work piece reaches the first work station, the chucking pressure to which it is subjected will be that of the groove 31' which, due to the reducing valve 33', may be as much below or above the chucking pressure in loading station as desired. In the next work station, the pressure may again be lowered or altered, as determined by the valve 33'', and in the third work station the pressure may be still further lowered or altered as determined by the reducing valve 33'''. It will be clear that, if it is desired to perform operations on the work piece in the loading station, that may be done and with the very heavy chucking pressure in the loading station a very heavy roughing or other cut may be taken. If no cut or only a light cut is to be taken in the loading station then the chucking up pressure in that station is not important, and the high pressure for closing the chuck on the work may be applied in, say, the first work station where it may be desired to take the heavy roughing cut. For certain classes of work, it may be desirable to successively reduce the pressures as the work progresses from station to station. That may be accomplished with the modification shown in Fig. 2. With other classes of work, a single reduction in pressure, as illustrated in Fig. 1, will suffice to prevent undue distortion of the work.

In the form of the invention shown in Figs. 4 to 8, the results accomplished are substantially the same or similar to those accomplished with the invention of Fig. 1. However, with the form shown in Fig. 4, the initial high chucking pressure is obtained directly from the pump and the lowered holding pressure on the chucks in work stations is secured by reducing the direct pump pressures. The general construction and chucking arrangement of Figs. 4 to 8 is that illustrated and fully described in said application, Ser. No. 551,136.

50 (Fig. 5) indicates generally a part of the spindle carrier carrying a plurality of spindles, as 51, having chucks 52 at the forward end and cylinders 53 at the rear end. The spindles are driven in this instance by a central drive gear 54 and clutch 55, as will be understood. Each cylinder 53, while carried by the spindles, does not rotate therewith, but is rotatable relatively thereto. The cylinder 53 is carried by the spindle through a ball bearing 56. Within the cylinder is a piston 57 secured to the piston or draw rod 58, through the medium of a piston extension and ball bearing 59. Thus, the spindle and chuck draw rod may rotate freely and the cylinder itself and piston may remain stationary or merely index with the spindle carrier. When the piston 57 moves rearwardly or toward the left, the chuck is closed, and consequently when the piston is moved in the opposite direction the chuck is opened.

The fluid pressure for actuating each piston and draw rod is furnished by a pump 60 (Fig. 4) which discharges through line 61 to an accumulator passage 62. In order to charge the accumulator, the pressure in line 61 and passage 62 must be built up sufficiently so as to open the pressure retaining valve 63 against the spring 64, which may be adjusted by the screw 65, as will be understood. The pump then charges the accumulator. As soon as the accumulator has been charged, pressure fluid therefrom passes through passage 66 so as to move the differential valve 67 toward the right and permit the escape of excess fluid through the accumulator discharge 68.

There is a valve cylinder 69 opening into the accumulator beyond the pressure retaining valve 63, and in the cylinder 69 is a valve 70 normally held in its uppermost position, as illustrated, by means of the spring 71, the stress on which may be adjusted by means of the screw 72. Pump pressure from passage 62 is free to enter through port 73 beneath the skirt of the valve 70 and with the spring normally maintain the same in its raised position. From the valve cylinder there is a substantial passage 74, which leads through pipe 75 to the space between the spool valve 76, as shown. The further construction of the device may now best be described by its operation.

Figure 4:
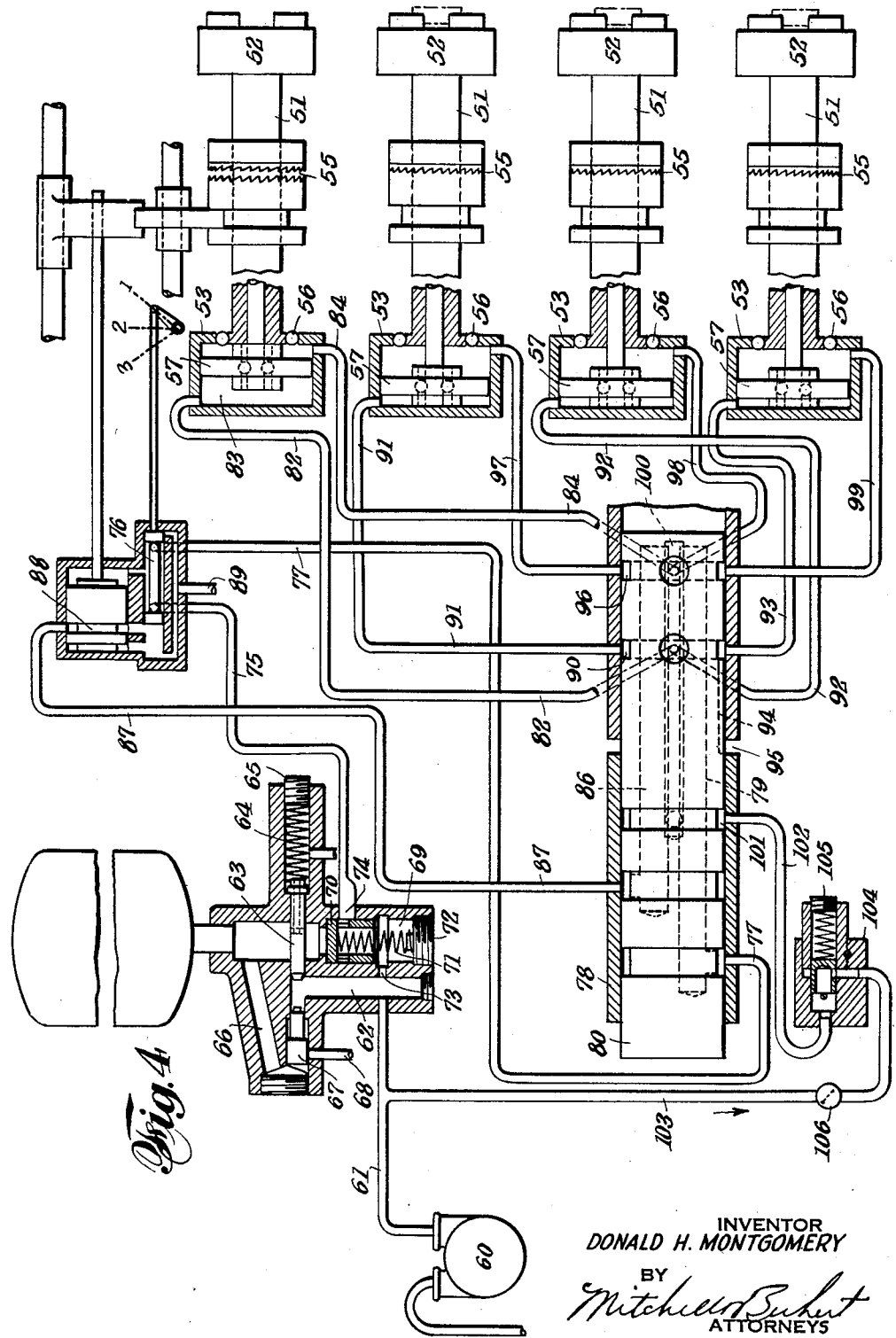
Fig. 4 is a more or less diagrammatic or schematic view of a different form of fluid pressure chucking mechanism like that disclosed in said application, Ser. No. 551,136, but illustrating features of my invention.

As soon as the piston valve 76 is moved to its present, or what may be termed the "No. 1" position, pump fluid from beneath the valve 70 will flow through passage 74, pipe 75, spool valve 76, thence through pipe 77 into the frame casting 78 (see also Fig. 6) which normally remains stationary. From pipe 77, pumped fluid flows through passage 79 in the valve plug 80 and then through the transverse plug passage 81 into pipe 82 communicating with the head end of the cylinder 83 in loading position. At the same time, fluid will flow from the tail-end of the cylinder 83 through pipe 84, to transverse plug passage 85 and longitudinal plug passage 86, thence through pipe 87, annular space 88 of the clutch piston, and then to the discharge or waste pipe 89. As soon as the fluid starts to flow as above described, the pressure beneath the spring pressed valve 70 in the accumulator will momentarily drop so that the accumulator pressure will momentarily overbalance the pump pressure beneath the valve 70 and the latter will be moved downwardly by means of the accumulator pressure and the port 73 will be cut off by the skirt of the valve 70 and further fluid flow from the pump or chamber 62 will cease. Accumulator fluid will then serve to move the piston of cylinder 83 toward the right, as indicated in Fig. 4, so as to unchuck the work piece. When the pressure in the accumulator drops, the spring 71, and ordinarily pressure leakage to the space beneath the skirt of the valve 70, will raise the latter, and direct pump pressure will then be transmitted through the lines heretofore noted and will subject the piston of cylinder 83 to direct pump pressure. It may also be noted, incidentally, that the pressure fluid from the accumulator or pump serves to unclutch the chuck in loading position from its drive gear.

When the work is to be chucked, the spool valve 76 is moved to what may be termed its "No. 2" position, at which time the line 75 will be cut off from the line 77 and the latter will be connected to the discharge or waste pipe 89, and the line 75 will then be connected through annular passage 88 with pipe 87 so that through the passages and device heretofore described, pressure fluid first momentarily flows from the pump and then from the accumulator into the tail-end of the cylinder 83 so as to chuck the work. As soon as the work has been chucked, the valve 70 will be raised, as heretofore noted, and direct pump pressure will be transmitted to the tail-end of the cylinder 83 so as to cause the chuck to "bite" into the work. The movement of the spool valve 76 to its "No. 3" position will not affect the pressure on the cylinder in loading station, but pressure fluid will be conveyed through pipe 75 to the upper piston and cause the chuck in loading station to be clutched to its drive gear.

In the plug 80, as illustrated in Fig. 7, is a long circumferential passage 90, which communicates through pipes 91, 92 and 93 with the head ends of all of the cylinders in work stations. The groove 90 is in communication with a longitudinal passage 94 (Fig. 4) and outlet or waste 95 so that the head ends of all the cylinders in work stations are open to the exhaust.

The plug 80, as illustrated in Fig. 8, is provided with a second circumferential long groove 96, which, through pipes 97, 98, and 99, is in communication with the tail-ends of all of the cylinders in work stations. The circumferential passage 96 is in communication with a longitudinal bore or passage 100 in the plug 80, which passage 100 is in communication with an annular groove 101 in the plug, and a pressure line 102 communicates with such annular plug groove. The line 102 is fed directly from the pump by means of a line 103. In this line is a reducing valve 104, which may be adjusted as by means of the screw 105 to reduce and regulate the pump pressure in line 102 and consequently in the tail-ends of all the cylinders in work stations. As heretofore described, each chuck in the loading station is chucked by pressure fluid from the accumulator, and, finally, by pressure fluid directly from the pump and at maximum pump pressure. As the chuck and cylinder in loading station index so as to bring the same into a work station, the tail-end of that cylinder comes into communication with the long annular groove 96 (Fig. 8), which, as heretofore stated, communicates pump pressure reduced by the reducing valve 104 to such tail-end and maintains that reduced pump pressure on the tail-end of that cylinder and of the others in work stations.

As has been heretofore described when the work is unchucked and chucked in the loading station, the direct pump pressure beneath the valve 70 is momentarily reduced so as to permit the latter to move downwardly and permit accumulator pressure to actuate the piston of the chuck in loading station. If such momentary reduction in pump pressure is, under the particular circumstances, sufficient to reduce the pressure on the tail-ends of the cylinders in work stations below that normally determined by the reducing valve 104, I may employ a check valve 106 to prevent such reduction of holding pressure on the chucks, but otherwise the check valve such as 106 would be required.

The valve plug 80 (Figs. 4, 6) may be rotated by means of the handle shown so that when a chuck has been closed by heavy pressure, it may be then subjected to lowered pressure even though such chuck is not indexed. Such a rotatable plug device could be employed with a single chuck or a single spindle machine to effect the chuck pressure changes.

It will be observed that I have provided means for chucking and unchucking a work piece and for employing a relatively high pressure as a final chucking pressure so as to cause the chuck to "bite" into the work. Thereafter the chucking pressure is reduced so as to minimize or entirely eliminate distortion of the work due to high chucking pressures. I thus obtain all the beneficial effects of a high chucking pressure and without its detrimental effects.

While the invention has been described in considerable detail and embodiments thereof illustrated, it is to be understood that various changes and modifications may be made, and that various embodiments of the invention may be employed in either single or multiple chucking devices without departing from the invention as defined in the appended claims.

I claim:

1. In a chucking machine, an indexable carrier, a plurality of chucks carried thereby, a cylinder and piston device for each said chuck, means for subjecting the cylinder and piston device of a chuck in loading station to high pressure for closing said chuck, and automatic means for causing the pressure to which said last mentioned cylinder and piston device is subjected to be reduced, whereby said chuck will be maintained closed by said reduced pressure when the same has been indexed into a work station.

2. In a device of the character indicated, a plurality of chucks, a common support for said chucks, fluid pressure actuated means for said chucks, said chucks being movable through work stations and successively into loading station, means for subjecting the fluid pressure actuated means of at least two of said chucks when in work stations to different pressures for holding said chucks closed, and means for subjecting the fluid pressure actuated means of the chuck in loading station to a pressure higher than either of the first mentioned pressures for initially closing said chuck.

3. In a device of the character indicated, a plurality of chucking devices, an indexable support for said chucking devices, fluid pressure actuated means for each of said chucking devices, said chucking devices being successively indexable through work stations into loading station, means for subjecting the fluid pressure actuated means of each of said chucks in work stations to low pressure for maintaining said chucks closed, and means for subjecting the fluid pressure actuated means of the chuck in loading station to high pressure fluid for closing the same.

4. In a device of the character indicated, a chuck, fluid pressure actuated means for operating the same, a pump, means for subjecting said fluid pressure actuated means to maximum pressure of said pump for closing said chuck, and automatic means for thereafter subjecting said fluid pressure actuated means to pressure less than said maximum pump pressure for maintaining said chuck closed.

5. In a device of the character indicated, an indexable support, a plurality of chucking devices carried thereby and indexable successively through work stations into loading station, fluid pressure actuated means for said chucking devices, means for subjecting the fluid pressure actuated device of the chuck in loading position to high pressure for closing the chuck, and means for subjecting the fluid pressure actuated means of at least two of the other fluid pressure actuated means of said chucking devices to low pressures for maintaining said chucks closed, said low pressure being different on said two last mentioned chucks.

6. In a device of the character indicated, a chuck, fluid pressure actuated means for operating said chuck, a pump and accumulator, means for conducting pressure fluid from said accumulator to said fluid pressure actuated means for closing said chuck, and means for conducting pressure fluid directly from said pump to said chuck for maintaining the latter closed, said last mentioned means embodying a reducing valve to reduce the pump pressure on said fluid pressure actuated means.

7. In a device of the character indicated, a support, a plurality of chucks carried thereby and indexable successively into loading station, fluid pressure actuated means for each of said chucks, means for subjecting the fluid pressure actuated means of the chuck in loading station to high pressure for closing the chuck, and automatic means for at the same time subjecting the fluid pressure actuated means of a chuck in a work station to low pressure for maintaining said last mentioned chuck closed.

8. In a device of the character indicated, a chuck, a fluid pressure actuated means for operating said chuck, means for subjecting said fluid pressure actuated means to high pressure for closing said chuck, and automatic means for subsequently lowering the pressure on said fluid pressure actuated means for maintaining said chuck closed.

9. In a device of the character indicated, a plurality of chucking devices, a common support therefor, means for indexing the same so as to bring each said chucking device successively into loading station, fluid pressure actuated means for each of said chucking devices, means for subjecting the fluid pressure actuated device of each of said chucking devices when in loading station to high pressure fluid for closing the chuck in loading station, and automatic means for subsequently subjecting the fluid pressure actuated means of said last mentioned chuck and at least one of another of said chucks to a lower pressure for maintaining the chucks closed after said chucks are indexed from loading station.

10. In a device of the character indicated, a chuck, fluid pressure actuated means for said chuck, a source of high pressure fluid, a source of low pressure fluid, means for connecting said fluid pressure actuated means to said source of high pressure fluid for closing said chuck, and means for disconnecting said source of high pressure fluid from said fluid pressure actuated means and connecting the latter with said source of low pressure fluid for maintaining said chuck closed.

11. In a device of the character indicated, a chuck, fluid pressure actuated means for operating said chuck, a source of high pressure fluid, a source of low pressure fluid, and means for sequentially connecting said fluid pressure actuated means with said source of high pressure fluid and said source of low pressure fluid, for the purpose described.

12. In a chucking device, a chuck, fluid pressure actuated means for said chuck, means for subjecting said fluid pressure actuated means to a relatively high pressure for holding said chuck closed, and automatic means for subsequently lowering the pressure on said fluid pressure actuated means and still maintaining said chuck closed.

13. In a device of the character indicated, an indexable carrier, a plurality of chucks carried thereby and indexable from loading to work stations, fluid pressure actuated means for each of said chucks, means for subjecting the fluid pressure actuated means of each chuck in loading station to one pressure for closing the chuck, means for subjecting the fluid pressure actuated means of each chuck in a work station to a pressure different from said one fluid pressure, and means for subsequently lowering the pressure on each of said fluid pressure actuated means in a subsequent work station.

14. In a device of the character indicated, a chuck, fluid pressure actuated means for operating said chuck, means for sequentially subjecting said fluid pressure actuated means to a high pressure for causing said chuck to bite into a work piece and to a lower pressure for holding said chuck closed on the work piece, for the purpose described.

15. In a device of the character indicated, a chuck, fluid pressure actuated means for operating said chuck, a high pressure fluid passage, a lower pressure fluid passage, and means for sequentially connecting said fluid pressure actuated means to said fluid pressure passages respectively, for the purpose described.

16. In a device of the character indicated, a chuck, fluid pressure actuated means for operating said chuck, fluid passage means for conducting high pressure fluid to said fluid pressure actuated means, and reducing valve means for subsequently automatically lowering the pressure of fluid on said fluid pressure actuating means, for the purpose described.

17. In a device of the character indicated, a chuck, means for causing the same to close on a work piece with heavy pressure, and means for automatically slightly loosening the grip of said chuck on the work piece while still securely holding the latter, for the purpose described.

18. In a device of the character indicated, an indexable member carrying a plurality of chucks, a fluid pressure actuated means for each of said chucks, a high pressure fluid passage, a low pressure fluid passage, means for indexing said chucks and fluid pressure actuated means and connecting each of said fluid pressure actuated means in sequence to said high pressure fluid passage, and subsequently to said low pressure fluid passage, for the purpose described.

19. In a device of the character indicated, an indexable member carrying a plurality of chucks, a fluid pressure actuated means for each of said chucks, fluid passage means for conducting high pressure fluid to said fluid pressure actuated means in sequence, and means including reducing valve means for subsequently automatically lowering the fluid pressure on said fluid pressure actuated means in sequence.

20. In a device of the character indicated, an indexable member carrying a plurality of chucks, a fluid pressure actuated means for each of said chucks, means for sequentially subjecting each of said fluid pressure actuated means to high pressure fluid for causing the chuck actuated thereby to bite into a work piece and to a lower pressure fluid for holding such chuck closed on the work piece.

21. In a device of the character indicated, an indexable member carrying a plurality of chucks, sequentially indexable to a plurality of tools to sequentially act upon work pieces carried by each of said chucks, means for causing each chuck to close on a work piece with heavy pressure and means for subsequently automatically slightly loosening the grip of each chuck on the work piece while still securely holding the latter, for the purpose described.

22. In a device of the character indicated, an indexable member carrying a plurality of chucks, a fluid pressure actuated means for each of said chucks, fluid pressure distributing means about which said indexable member and fluid pressure actuated means are indexed, said distributing means including a high pressure fluid passage to communicate with the fluid pressure actuated means of a chuck in one work station, said distributing means including a lower pressure fluid passage to communicate with the fluid pressure actuated means of the same chuck when indexed to another work station, whereby each of the fluid pressure actuated means of said chucks will be sequentially connected to said high pressure fluid passage and said low pressure fluid passage while in work stations.

23. In a device of the character indicated, an indexable carrier, a plurality of chucks carried thereby, means for indexing said carrier to move said chucks successively from loading station to work stations, a fluid pressure actuated chucking means for each of said chucks, means for subjecting the fluid pressure actuated means of each chuck in loading station to pressure fluid for closing the same, and means for subjecting two of said pressure fluid actuated means of two of said chucks in work stations to fluid pressures different from each other, for the purpose described.

24. In a device of the character indicated, an indexable carrier, a plurality of chucks carried thereby, means for indexing said carrier to move said chucks successively from loading station to work stations, a fluid pressure actuated chucking means for each of said chucks, means for causing each chuck in loading station to be closed, and means for subjecting two of said pressure fluid actuated means of two of said chucks in work stations to fluid pressures different from each other, for the purpose described.

25. In a device of the character indicated, a rotary carrier, a plurality of chucks carried thereby, means for rotating said carrier to move said chucks successively through a loading station, a fluid pressure actuated means for each of said chucks, a pressure fluid supply system for said fluid pressure actuated means, and means for subjecting each of said fluid pressure actuated means to a high pressure from said system and subsequently to a lower pressure during the time a chuck is carried from loading station around and back to loading station, for the purpose described.

26. In a device of the character indicated, a rotary carrier, a plurality of chucks carried thereby, a fluid pressure actuated means for each of said chucks, means for rotating said carrier to move said chucks through a loading station, and means for subjecting the fluid pressure actuated means of a plurality of said chucks after leaving loading station and before again reaching loading station to a plurality of different pressures, for the purpose described.

27. In a device of the character indicated, an indexable carrier, a plurality of chucks carried thereby, a fluid pressure actuated means for each of said chucks, a relatively fixed member about which said indexable carrier moves, means cooperating with said relatively fixed member and having passage means connected to said fluid pressure actuated means, said relatively fixed member and said means cooperating therewith having a plurality of passages, whereby each of said fluid pressure actuated means will successively communicate with said passages upon indexing of said carrier, and means for subjecting a plurality of said passages communicating with said fluid pressure actuated means of a plurality of chucks in work stations to different pressures, for the purpose described.

28. In a device of the character indicated, an indexable carrier, a plurality of chucks carried thereby, a fluid pressure actuated means for each of said chucks, a plurality of circumferentially arranged passage means to simultaneously communicate with said fluid pressure actuated means of a plurality of said chucks when in work stations, means subjecting the first of said passages in the direction of indexing to a high pressure fluid, means for subjecting a subsequent one of said passages in the direction of indexing to a lower pressure fluid, and means for indexing said carrier to successively cause the fluid pressure actuated means of each chuck to communicate with said first passage and subsequently with said subsequent one, for the purpose described.

DONALD H. MONTGOMERY.